United States Patent [19]

Barr

[11] 4,018,211
[45] Apr. 19, 1977

[54] SOLAR ENERGY COLLECTION AND TRANSFER ARRANGEMENT AND METHOD, AND METHOD OF ASSEMBLY

[75] Inventor: Irwin R. Barr, Baltimore County, Md.

[73] Assignee: AAI Corporation, Cockeysville, Md.

[22] Filed: July 9, 1975

[21] Appl. No.: 594,431

Related U.S. Application Data

[63] Continuation of Ser. No. 465,845, May 1, 1974, abandoned.

[52] U.S. Cl. .............................. 126/270; 126/271
[51] Int. Cl.[2] ............................................ F24J 3/02
[58] Field of Search ........... 126/270, 271; 237/1 A; 60/641

[56] References Cited

UNITED STATES PATENTS

| | | | |
|---|---|---|---|
| 2,680,565 | 6/1954 | Lof | 126/271 |
| 3,018,087 | 1/1962 | Steele | 126/271 |
| 3,102,532 | 9/1963 | Shoemaker | 126/270 |
| 3,145,707 | 8/1964 | Thomason | 126/271 |

*Primary Examiner*—Kenneth W. Sprague
*Assistant Examiner*—James C. Yeung
*Attorney, Agent, or Firm*—Reginald F. Pippin, Jr.

[57] ABSTRACT

A structural solar energy collection and transfer arrangement and method, and method of assembly, including an insulating light-transmitting honeycomb sandwich array and a lateral fluid flow solar energy collection and heat transfer honeycomb sandwich array, the lateral fluid flow honeycomb sandwich array having dark, preferably non-gloss or dull surfaced, honeycomb walls and bottom surface for solar energy absorption and transfer to a fluid, preferably a liquid, passed laterally through fluid passageway openings formed in the honeycomb walls. Solar energy is absorbed and transferred to a flowing fluid, by passing solar light rays through the insulating honeycomb sandwich array and into contact with the dark walls and base of the facially interconnected heat transfer honeycomb sandwich array, and passing the heat transfer fluid through the lateral openings formed in the honeycomb cell walls and thereby flowing such fluid through adjacent honeycomb cells. In a preferred method of assembly when using metal honeycomb in one or both of the honeycomb arrays, an insulating single layer or multilayer bead is preferably formed on the edges of one or both sides of the honeycomb of the insulating honeycomb sandwich array and on the upper or outer facing edges of the honeycomb of the heat transfer honeycomb sandwich array, and such beaded edges are in turn secured, as by adhesive, to a respective light-transmitting panel sheet or plate.

141 Claims, 23 Drawing Figures

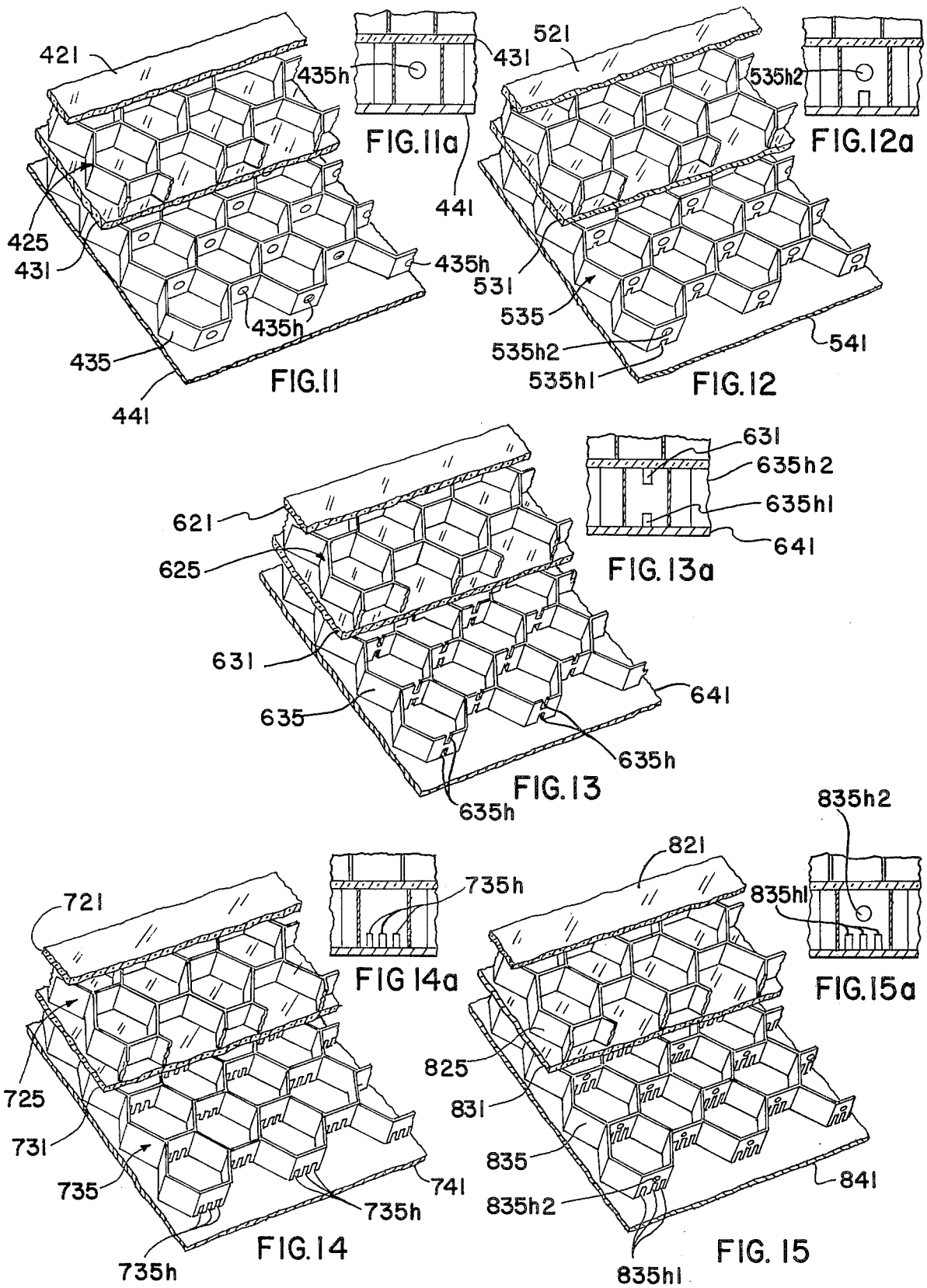

SOLAR ENERGY COLLECTION AND TRANSFER ARRANGEMENT AND METHOD, AND METHOD OF ASSEMBLY

This is a continuation of application Ser. No. 465,845 filed May 1, 1974, abandoned.

This invention relates to solar energy collection and transfer arrangements and methods, and methods of assembly of solar energy transfer arrangements and insulating arrangements, and more particularly to a novel multilayer honeycomb sandwich panel solar energy collection and transfer arrangement having good load-bearing structural properties, and to a method of collecting and transferring heat from solar energy rays by passage of a heat transfer fluid laterally through one honeycomb array of a multilayer light-transmitting and absorbing honeycomb array panel, and to a unigue method of assembling such solar energy collecting and transfer arrangements, as well as other radiation insulating honeycomb arrangements.

It is an object and feature of the present invention to provide a honeycomb sandwich solar energy collecting and transfer arrangement and method which will be reasonably efficient and which will provide relatively good structural load-bearing properties, thereby enabling the arrangement to be utilized in various building arrangments, such as curtain walls of buildings, or as roof elements for buildings.

A further object and feature of the present invention is to provide a method of assembling an insulating honeycomb structural sandwich array which is useful as a portion of a structural honeycomb solar energy collecting and transfer arrangement, and which is useful in a method of forming a multilayer honeycomb array solar energy collecting and transfer arrangement.

Still a further feature and object of the present invention is the provision of an arrangement and method for solar energy collection and transfer passage of solar energy rays through a structural insulating honeycomb array and into contact with an interconnected heat transfer honeycomb array through which heat transfer fluid is passed to effect solar energy absorption and transfer for utilization external of the solar energy transmitting, collection and transfer arrays.

Still other objects, features and attendant advantages will become apparent to those skilled in the art from a reading of the following detailed description of several illustrative embodiments constructed and modes of practice utilized in accordance with my invention, taken in conjunction with the accompanying drawings, wherein.

Figure 1:
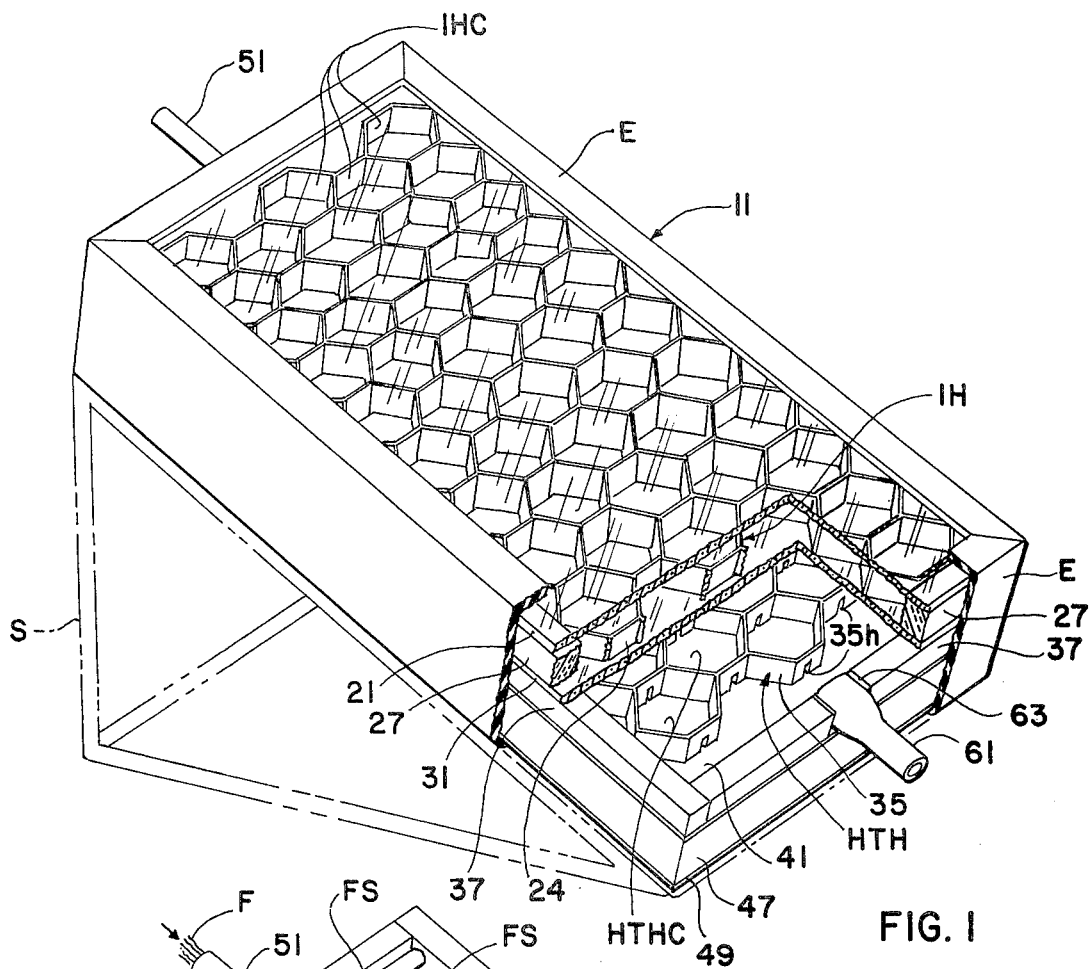
FIG. 1 is an orthographic view partially broken away for clarity of illustration, and illustrating a solar panel assembly according to the present invention.
Figure 6:
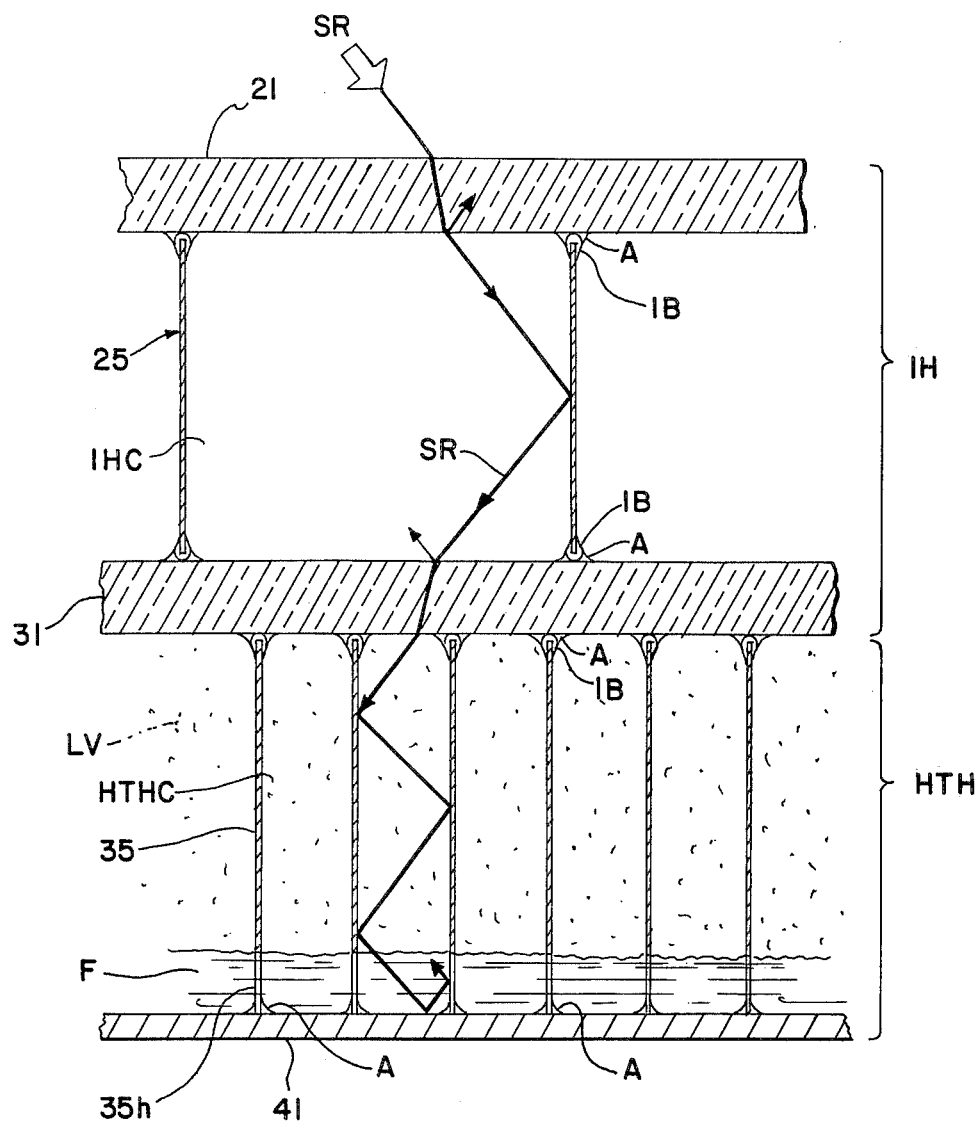

FIG. 6 is a partially schematic view generally indicating the passage of a ray of light from the sun through a modified embodiment of the solar panel assembly of FIG. 1, and further illustrating the internal construction of one preferred embodiment of a panel assembly utilizing glass outer and mid sheets or panels in conjunction with metallic honeycomb sections. This view is shown horizontal, for simplicity of illustration, although the panel assembly may be inclined at an angle, or vertical, for a given application.

FIGS. 7–10 are partially schematic illustrations, in fragmentary longitudinal section, of four modified embodiments according to the invention.

FIGS. 11–15 are partial cutaway schematic orthographic illustrations of further embodiments and modifications according to the invention, FIGS. 11a–15a being corresponding fragmentary elevation view sections illustrating the fluid passageway openings in the respective modifications and embodiments of FIGS. 11–15.

Figure 16:
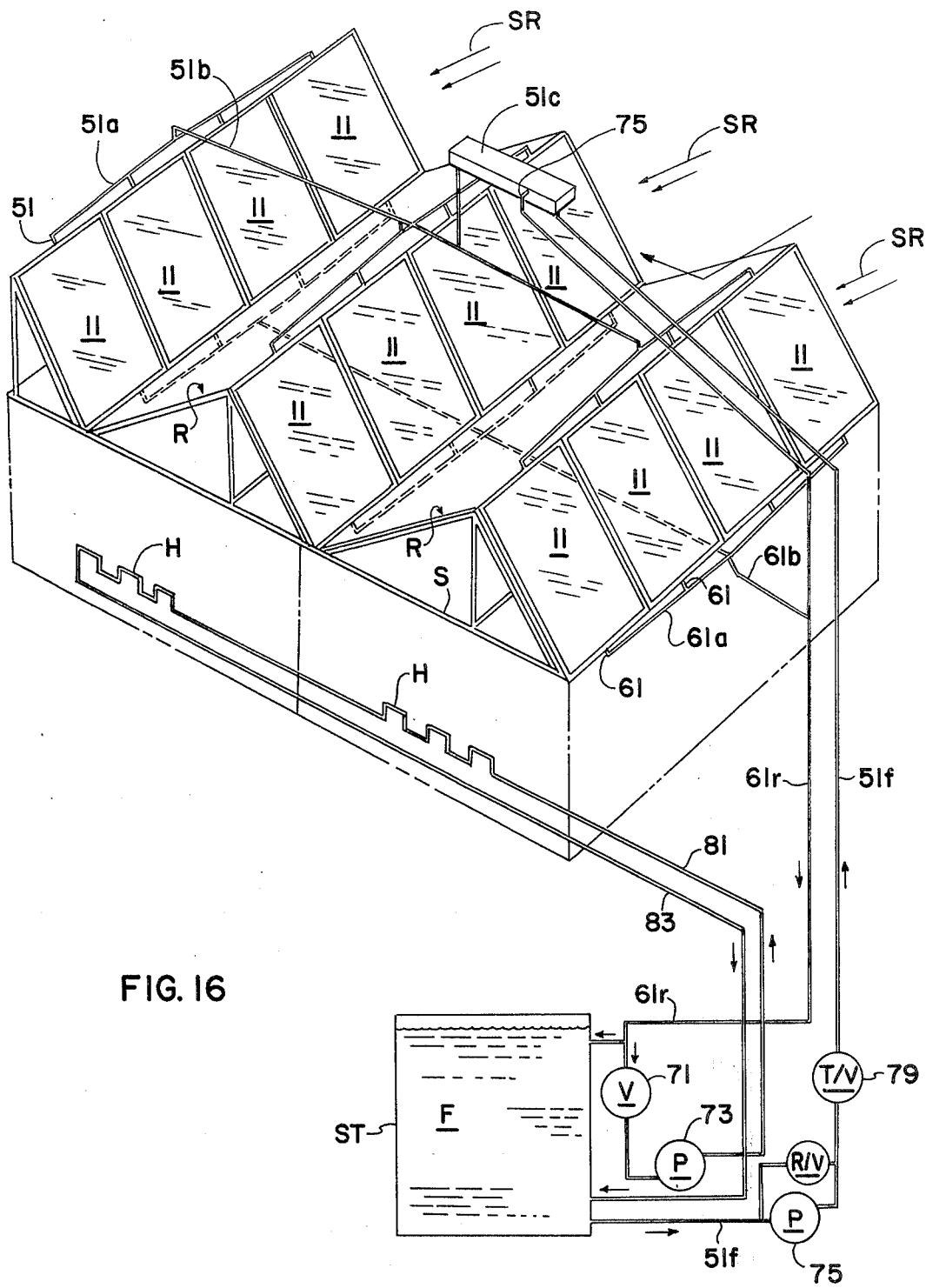

FIG. 16 is a schematic illustration of a solar energy transfer arrangement utilized for heating a building according to the present invention, and in which the structural solar energy collector panels according to the present invention may be utilized as roofing elements or as additive elements above a standard roof.

Figure 17:
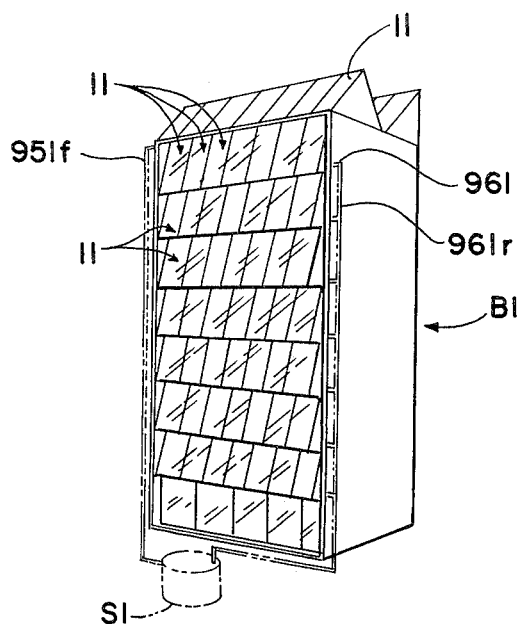

FIG. 17 illustrates schematically a further building arrangement utilizing structural solar energy collection and panel arrangements as curtain wall elements or units of a building, and additionally as roofing elements or units or as additive elements above a conventional roofing.

Figure 18:
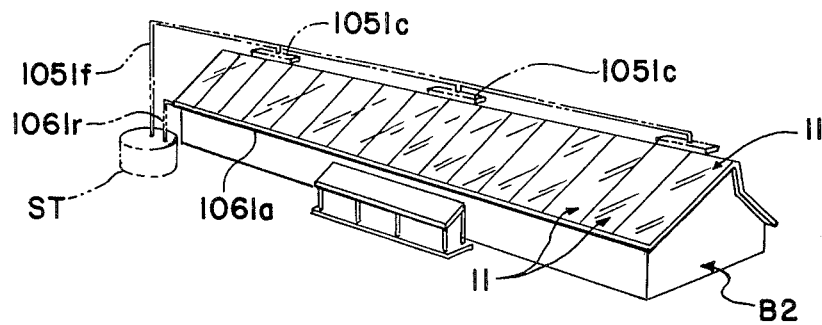

FIG. 18 is a schematic illustration of a further building utilization arrangement according to the present invention, and utilizing the structural solar collection and transfer panels as structural roofing units for the building.

Figure 2:
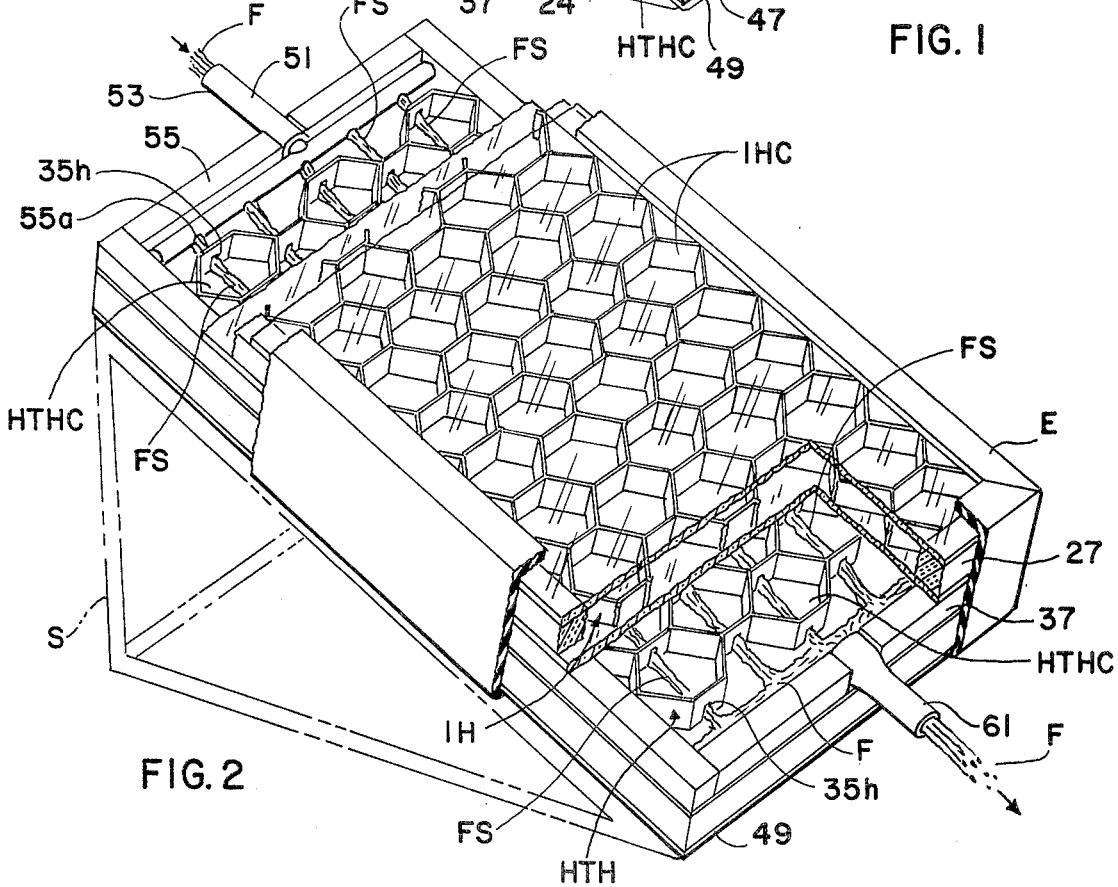
FIG. 2 is a view similar to FIG. 1 and showing the passage of a heat transfer fluid in the form of a liquid through the solar panel assembly of FIG. 1.
Figure 3:
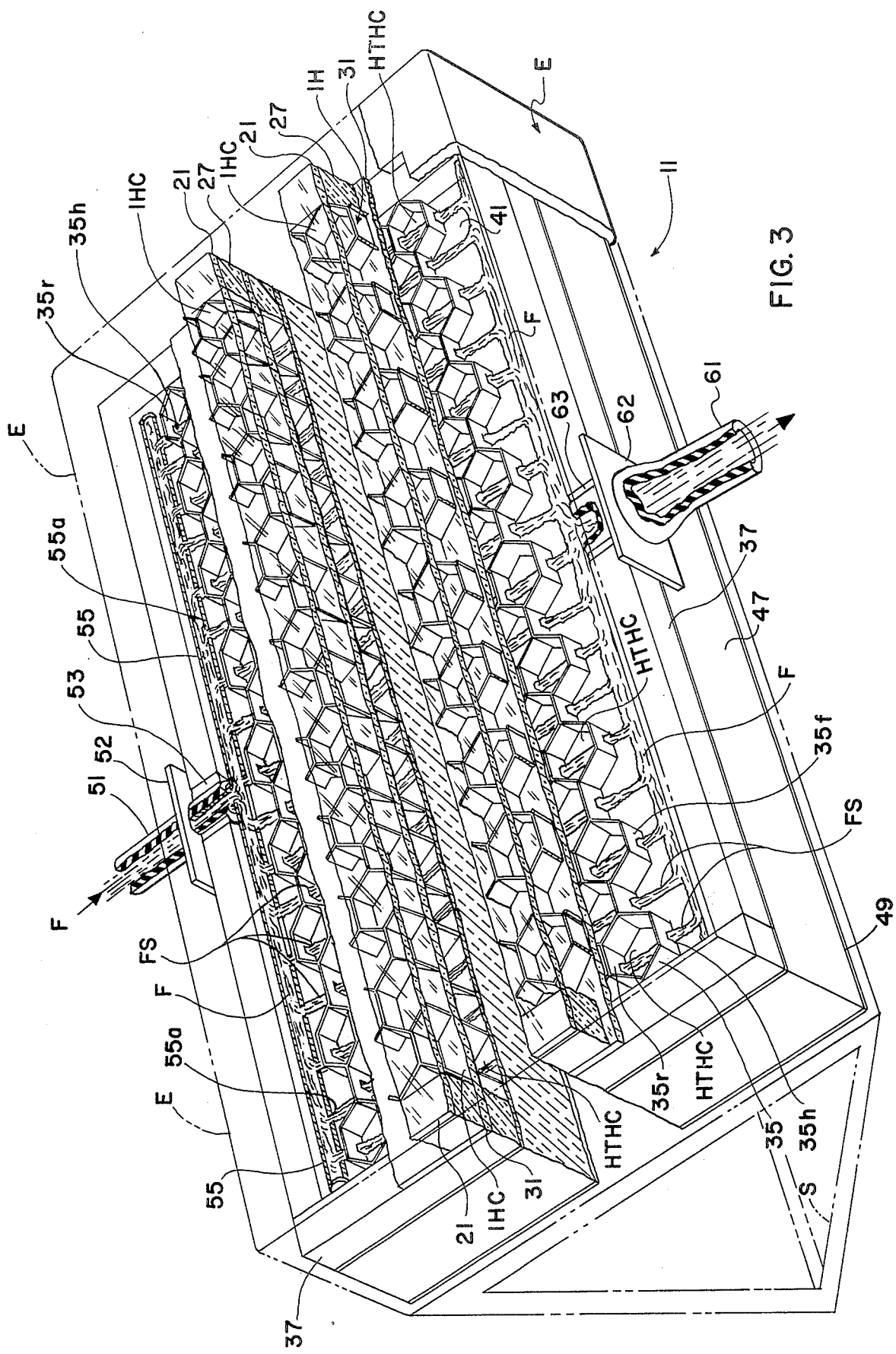
FIG. 3 is an enlarged view, in fragmental sections, of a solar panel assembly of the general construction shown in FIG. 1, showing in more detail and clarity the parts thereof and the mode of passage of a liquid fluid therethrough for solar energy heat collection and transfer in accordance with the invention.
Figure 4:
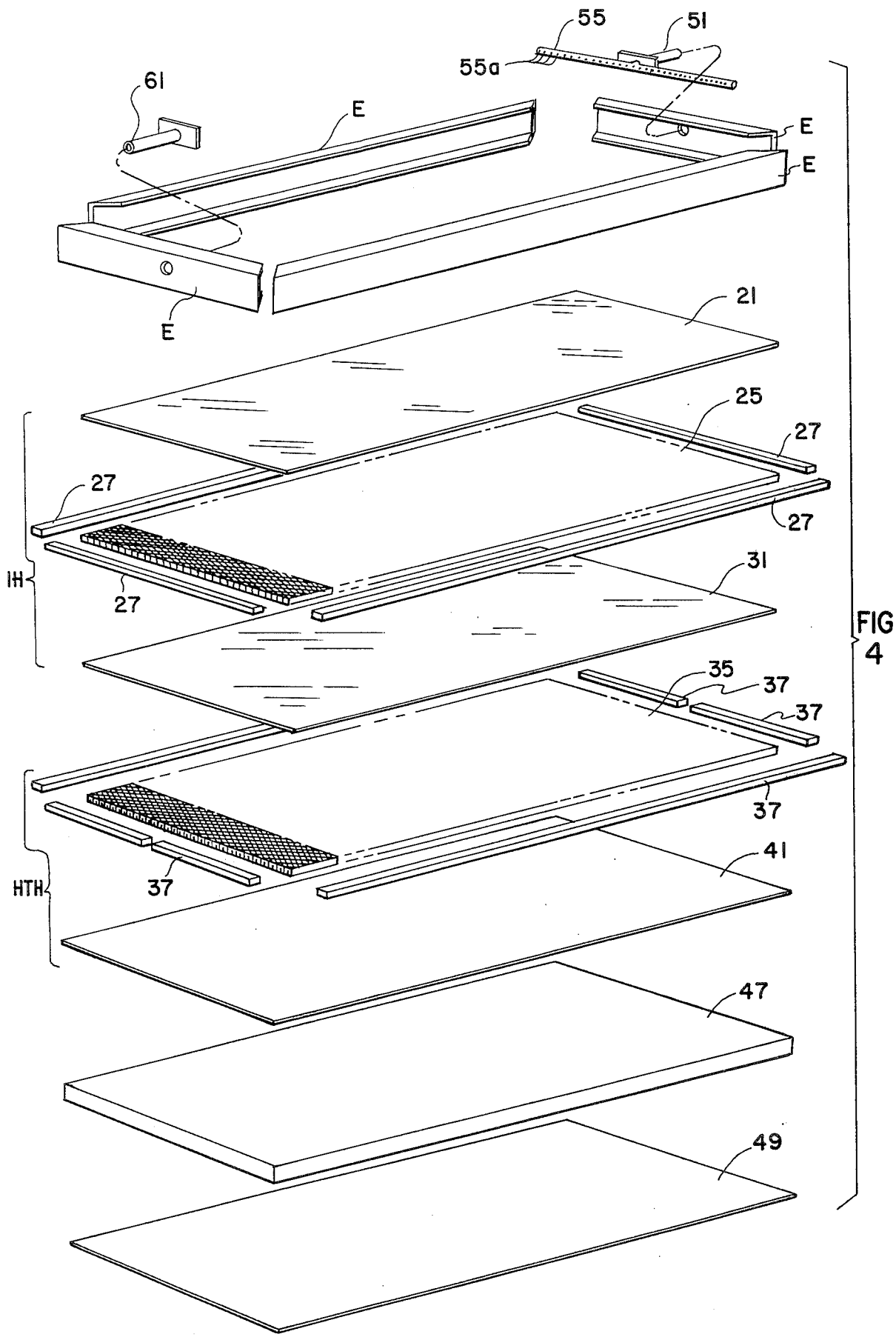
FIG. 4 is an exploded view of the solar panel assembly of FIG. 1, the parts thereof being shown in generalized form for clarity and simplicity of exploded view presentation.

Referring now in detail to the Figures of the drawings, a solar radiation energy collection and transfer structural panel assembly 11, hereinafter generally referred to as a structural solar panel assembly 11, is shown in FIGS. 1–3, utilizing an interconnected multilayer honeycomb sandwich construction, including a solar light-transmitting insulating honeycomb sandwich array, generally indicated at IH, and a lateral fluid flow solar energy collection and transfer honeycomb sandwich array generally indicated at HTH, with a suitable insulating protective enclosure E, which may suitably be made of rubber, and an insulating backing 47 and protective back cover plate 49, mounted on a stand or support S at a suitable angle of inclination for desired passage and collection therein of solar energy rays SR.

The insulating honeycomb sandwich array IH includes an outer sheet, plate or panel 21, an inner sheet, panel or plate 31, and an interconnecting honeycomb array section 25; and the energy collection and transfer honeycomb sandwich array HTH includes a honeycomb section 35 and bottom plate, sheet, or panel 41, the honeycomb section 35 being facially interconnected along its top and bottom edges to the faces of bottom plate or sheet 41 and mid sheet or plate 31 of the sandwich array IH.

The outer and inner sheets 21, 31 are suitably secured to the honeycomb section 25, preferably through the medium of a cured adhesive or cement along the intersection respective edges of the honeycomb at the zones of intersection thereof with the respective two sheets 21 and 31. The outer and mid sheets 21 and 31 may be suitably formed of glass, plastic or other sheet material which is preferably efficiently transparent to the major available radiant solar energy spectrum. The honeycomb section 25 may be formed of opaque, transparent, translucent and/or reflective-surfaced honeycomb material, which honeycomb material may be itself constructed in various cell configurations and have various cell cross sections and constructions, and transmits solar energy, either directly or by reflection or both, through the joining mid panel or sheet 31, to the base or energy collection and transfer honeycomb sandwich array HTH, within which energy collection and transfer is effected, with both impinging ray heat and accumulated heat in the array HTH being transferred therein to a fluid F which is flowed therethrough, by passage through inlet conduit 51 and outlet conduit 61. To this end, the inlet conduit 51 may suitably be provided with a lateral header conduit 55 connecting therewith in fluid flow relation, and having spaced fluid distribution orifices 55a disposed in general alignment with fluid flow passageway orifices 35h formed in the forward and rear lateral walls 35f, 35r or honeycomb cells HTHC of the honeycomb section 35 of the solar energy collection and transfer honeycomb sandwich array HTH.

The honeycomb 25 in the insulating honeycomb sandwich array IH may, in various embodiments, be formed of various sheet or strip materials, such as metal, reflective-covered (e.g., metal or plastic-coated or covered, as by painting or vacuum deposition or lamination of layers) plastic or paper, and may be of transparent or translucent material, such as various plastic resins, coated or uncoated fiber materials such as paper, or other suitable honeycomb material.

As an aid to minimizing return flow convection losses through the insulation honeycomb sandwich array IH, the insulating honeycomb sandwich array may be and is preferably evacuated to an effective extent for most effective return convection and conduction barrier action with respect to heat transmission in the outward direction, although partial or no evacuation may be and is readily accommodated with some decrease in overall efficiency.

The honeycomb 35 of the energy collection and transfer honeycomb sandwich array HTH may be of plastic, metal or plastic-coated or metal coated fiber or other composition material such as paper, or other fluid compatible heat transfer material, being preferably dark or dark coated on its surface (e.g., black, etc.), and has, as heretofore mentioned, lateral fluid flow passageway orifices 35h formed in the walls 35f, 35r of the respective honeycomb cells HTHC, thereby connecting the cells in lateral fluid flow relation for the desired flow of a heat transfer fluid F therethrough, preferably in the form of a liquid, although other flowable heat transfer media such as air or other gas may be utilized, the heat transfer fluid F being heated as a result of heat transfer thereto, during passage through the lateral fluid flow orifices 35h and in contact with the walls of the cells HTHC and the upper surfaces of the bottom wall 41 of the energy collection and transfer honeycomb sandwich array. In the illustrated and preferred embodiment of FIGS. 1-6, the lateral fluid flow passageway openings 35h are formed by generally longitudinally aligned openings in the front and rear honeycomb cell walls 35f, 35r of respective cells HTHC, although such may be offset or staggered, and may be single or multiple in various ones of the walls of respective cells HTHC, for a desired quantity and/or path of fluid flow therethrough.

For liquid fluids, as in the embodiment of FIGS. 1-6, these lateral wall fluid flow orifices or openings 35h are preferably formed on the lower edges of the honeycomb cell walls as by slots, grooves or other holes or openings, and preferably interface with the lower panel or sheet 41 of the honeycomb sandwich array HTH.

The bottom panel or sheet 41 of the honeycomb sandwich array HTH is preferably opaque, and may be formed of metal, plastic, glass, or other suitable material, being desirably dark, (e.g. black, etc.) on the upper or outward facing surface, and is preferably of a material providing good heat transfer to the particular fluid F being passed through the honeycomb cell passageway openings 35h. Water is a suitable inexpensive liquid fluid, although other liquid fluids F may be employed for a given embodiment or utilization, it being understood that various liquids and other fluids, including gasses, have different heat transfer, viscosity, volatility, and other characteristics, which may be useful in a given embodiment or instance of use.

An insulation backing layer or layers 47 is preferably provided beneath the base or energy collection and transfer honeycomb sandwich array or layer HTH, as heretofore noted, and be either a further insulated honeycomb array or layer, and/or of other suitable insulation material, such as insulated foam plastic, glass fibre matting, etc.

Each of the insulating honeycomb sandwich array IH, and the solar energy collection and transfer honeycomb sandwich array HTH, includes a perimeter sealing wall in the form of a plurality of foam insulation strips 27, 37, which are suitably adhesively secured together and to the respective sheets or panels 21, 31, 41 of the two arrays IH and HTH. Thus, the insulating honeycomb sandwich array is desirably hermetically sealed from the outside atmosphere, and each of the cells IHC is in turn sealed from one another along their oppositely extending wall edges at the jointure line thereof with the outer and mid panels or sheets 21 and 31. In addition, the energy collection transfer honeycomb sandwich array HTH is sealed from the upper or outer insulating honeycomb sandwich array IH and its internal cells IHC, while also being fluid sealed around its perimeter by strips 37 in order to enable the passage of fluid F therethrough from the inlet conduit 51 and header 55 through the lateral wall passageway openings 35h, and out therefrom through the outlet conduit 61 after collection at and along the base of the honeycomb sandwich array HTH, as generally indicated in FIGS. 2 and 3.

The fluid inlet conduit 51, as well as the fluid inlet conduit 61 may be suitably secured and sealed in place as through the medium of reinforcing and securing plates 42, 62 and sealing adhesive 53, 63, and these inlet and outlet conduits may, if desired, be suitably formed of metal, and/or rubber, and/or other desired material.

The structural solar panel assembly 11 may be formed in various configurations, preferably being flat sandwich panels which provide substantial structural rigidity and over-all load-bearing capacity, although curved or other panel shapes may be employed. The panels may be employed as structural building units such as roof panels, which may be relatively long and may be secured on and between inclined rafters, and/or such may form inclined side wall building panels, particularly where side wall building panels of the curtain type are desired, and desirably where an otherwise blank wall faces the South or other major solar direction. It will, of course, be appreciated that the structural solar panel assembly 11, may be also be utilized, with some lesser efficiency in instances where some light-transmission is desired, in which instance the bottom wall 41 of the honeycomb sandwich array HTH may be transparent or translucent, instead of being opaque as in the preferred embodiment as discussed above.

The liquid or other flowable heat transfer material F is laterally flowed through the passageways 35h of the honeycomb sandwich array HTH, preferably by gravity flow, down (as illustrated), or down and sideways, although a partial or total forced fluid flow may be utilized, either down, forward or sideways, for a given embodiment or instance of utilization. While parallel path fluid flow is utilized through the honeycomb sandwich array HTH, it will be appreciated that series path flow may also be utilized, the preferred form being parallel path down flow as shown in FIGS. 2 and 3. The fluid F may be colored to aid in energy absorption and/or transfer, as may be desired. A common or multiple fluid supply line or header may be provided at the top (as in FIG. 1) or sides of the honeycomb sandwich array HTH, and as generally shown in FIG. 16 in the case of header tank 51c and header supply lines 51a which join to a plurality of solar panel assemblies 11 through the medium of inlet conduits 51 for each of the respective panel assemblies 11. The duly sized common supply lines 51a may be utilized for fluid supply and recirculation preferably in a generally closed flow loop, also as generally indicated in FIG. 16, in which a building is heated by parallel fluid flow passage of the heating fluid F to radiant heaters H, such as radiators, in a building B.

Lower or footer outlet conduit or conduits 61 for the structural solar panel assemblies 11 may incorporate a separate, integral or unitary roof gutter (not shown) of suitable material and may be suitably formed by assembly or unitarily as be extruded or other molded plastic, such as when the foundation panel assemblies 11 are to be used as roof panels.

For maximum solar energy collection it is desirable to have the highest possible transmittance of the solar energy rays through the insulating honeycomb array IH, including its two sheets 21, 31, in their passage throughout as much as possible of solar spectrum including the infrared, to a wave length of 2.5 microns, beyond which the radiant energy of the sun drops to relatively negligible proportions. In the far infrared corresponding to temperatures found at the surfaces of energy absorbing and transfer elements 35, 41 of the solar energy panel assemblies 11, the transparent or translucent media, in the form of sheets 21 and 31, should be opaque at such frequencies, to act as a barrier to return radiation outward of the black body for infrared energy. These far infrared frequencies include those generated as black body radiation, and would correspond to the radiation from the heated up black or other dark-surfaced bottom wall 41 and honeycomb section 35. It has been found that ordinary window glass, particularly that selected for low iron content, is a desirable material for the light-transmitting sheets 21, 31. However, various glasses light transmitting and plastics, of various thicknesses and content, are suitable for utilization in the sheets 21, 31. For instance, glass containing 10% iron oxide, of approximately 0.109 inch thickness, approximates some of the cheapest type single strength glass now on the market, and available data on such glass indicates that it will pass approximately 90% of the visible and infrared solar frequencies up to about 2.7 micron wave length. In the region of from 8–10 microns, which covers the re-radiation energy from the array HTH at the temperatures of interest in solar space heating applications, this glass becomes substantially opaque to such frequencies in this conventional and generally practical thickness. High iron contents of for instance up to 0.15 are satisfactory at this conventional thickness in effectively stopping or minimizing long wave infrared re-radiation transmittance to the atmosphere through the glass sheets 21, 31. Various lengths versus width ratios L/W of the outer honeycomb array IH, as well as the inner honeycombs array HTH, may be utilized, with varying effects. For instance, considering the outer honeycomb array IH, at L/W's under 1, losses due to the absorption of energy by reflection of the rays SR are minimized, in view of the minimizing of reflections from the lateral walls of cells IHC, while at high L/W's several reflections may absorb as much as 30% of the incoming energy through a series of cell wall reflections. All of the energy absorbed by the outer array IH is not completely lost as a result of such reflections, as such absorbed energy does tend to warm the outer honeycomb layer IH of the collector and decreases some of the conduction and long wave radiation; however, such absorption of incoming energy by the array IH does have an appreciable reducing effect on the over-all transmission efficiency.

The efficiency of heating water or other liquid by direct impingement of solar energy rays SR into a fluid F, is higher than that effected by heating a metal plate and conducting the plate heat to the liquid. In the present invention, some of the rays will ultimately impinge upon the water directly, while others of the rays will be terminated or substantially absorbed through their impingement on the various cell walls and/or the light transmitting sheets. In any event, the end result is the absorption and transfer to the fluid F by the honeycomb cell array HTH, including its honeycomb section 35 and bottom wall 41 of a substantial quantity of solar energy transmitted through the outer array IH to this inner array HTH. The indirect transmission of the heat energy from rays SR into the water or other fluid F may also be aided by the employment of relatively long L/W cells for the collection and heat transfer and energy transfer array HTH. Various reflective losses to the black or relatively dark coated honeycomb 35 are in large part conducted to the flowing water or other fluid L, in combination with the direct collection of solar energy by impingement of the rays SR on the water or other fluid F itself. Many reflections from the cell side walls and bottom of the array HTH insure that a substantial quantity of the energy is collected by the fluid either directly by reflected or direct ray SR impingement thereon, or by transmission from the cell HTHC walls and bottom wall 41 to the fluid by conduction.

An illustrative embodiment form is shown in FIG. 6, in which the outer array employs an L/W for the cells IHC of less than unity, whereas the cells HTHC of the array HTH are substantially greater than unity. It will be noted that a substantial variation in indidence angle for the solar rays SR may be accommodated with minimum reflections through the array IH, and that a substantial number of reflections occur within the area HTH before final termination of the light ray within the fluid F. Each reflection, of course, results in a diminishment of the reflected ray energy. If the air in the outer honeycomb array layer IH is totally evacuated, then the return convection losses therethrough may be virtually eliminated; however, only a very high vacuum will eliminate conduction. Considering the outer layer as air filled, and since its L/W will in many embodiments be as small as feasible to avoid reflectance losses therethrough, the ability of the cells IHC to suppress convection is not particularly great in the form as illustrated in FIG. 6, although a substantial vacuum will serve to minimize convection and convection losses. Considering a typical ¾ inch cell IHC width versus 0.65 inch depth, the ratio of L/W is in such instance less than 1, and such cell is still small enough to reduce convection, if not entirely eliminate such when the collector is flat or only inclined slightly from the horizontal. However, if the panel 11 is vertical or inclined at relatively high levels of inclination, the convection, and consequently the convection loss, within and through the cells IHC, is substantially greater. Conduction losses are increased if the liquid or other fluid F being heated in the array HTH is in direct contact with the inner face of mid sheet 31, rather than separated by an air or air and water vapor barrier as indicated generally by the evaporated liquid vapor barrier LV formed from the heated liquid fluid F in FIGS. 6 and 7.

Figure 8:
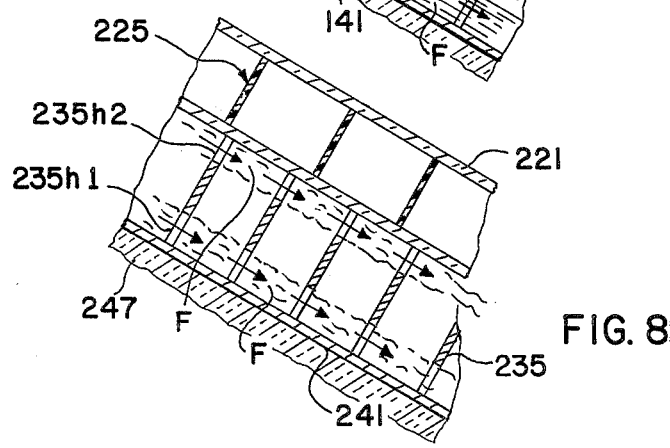

In the embodiment of FIG. 8, a gaseous heat transfer fluid F is passed through upper and lower cell wall holes 235$h$1 and 235$h$2 of the heat transfer honeycomb array 235.

Figure 9:
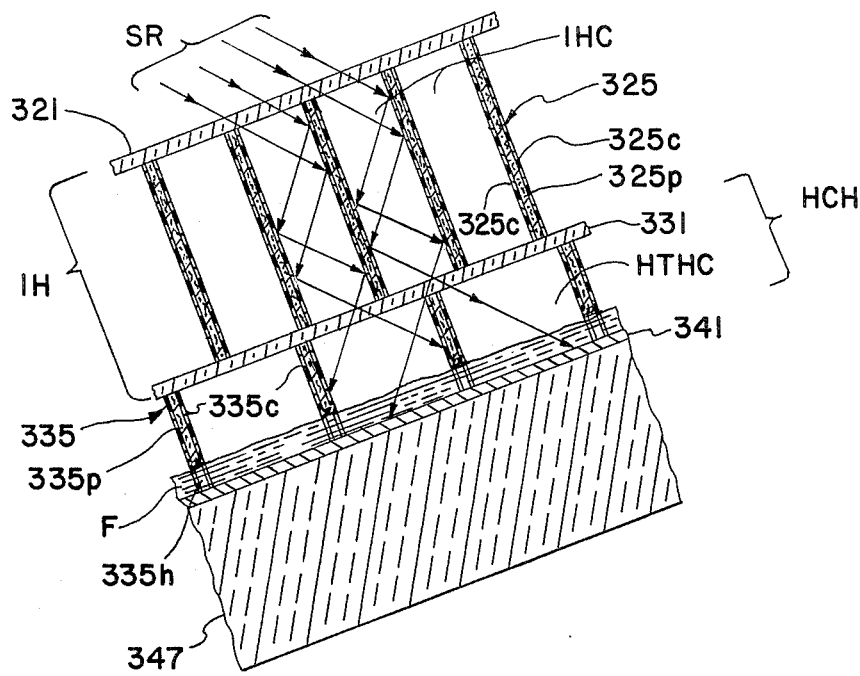
Figure 10:
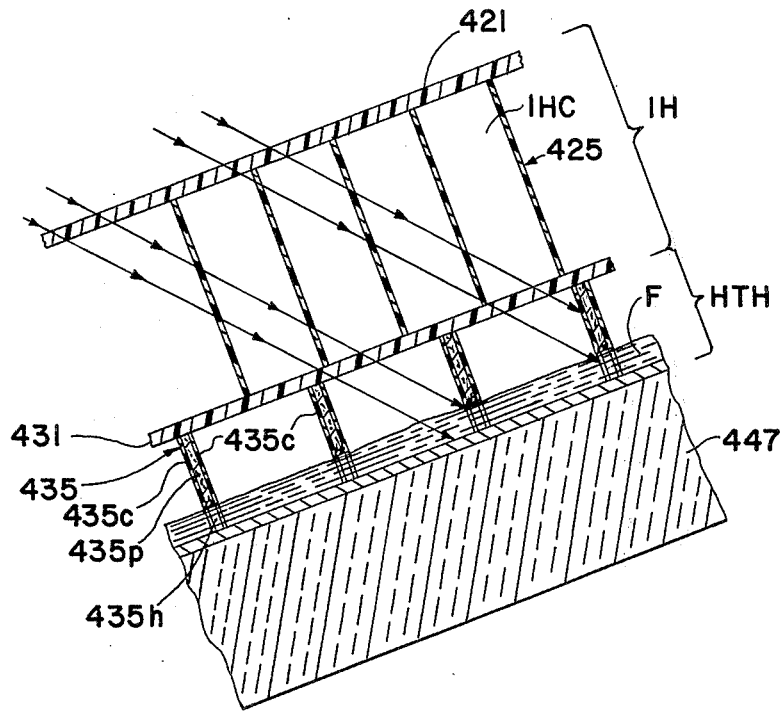

Modified embodiments according to the invention are illustrated in FIGS. 9 and 10, in which the cells IHC have an L/W substantially greater than unity, and in which the cells HTHC have an L/W less than unity. Various combinations of L/W may be employed in various embodiments. In the embodiment of FIG. 9, the honeycomb 325 is formed of opaque light-reflective material, such as paper 325$p$, having a reflective coating or covering 325$c$, such as a Mylar or other plastic coating or covering, or otherwise preferably having a shiny highly reflective surface, formed as for instance by vacuum deposition of suitable material thereon. The honeycomb array 325 of the energy absorbing and transfer array HTH is formed of a paper honeycomb core 335$p$ also having a coating or covering, which is preferably of dark colored plastic or other suitable material impermeable to or of low-permeability to liquid such as water or other desired fluid F. It will be noted in this embodiment of FIG. 9 that the solar energy rays SR pass through the glass sheets 331, 335, being reflected in cells IHC a multiple number of times through the interaction thereof with the reflective walls of the cells IHC, and ultimately being reflected into the cells HTHC, and thereby encountering either or both of the walls of the cells HTHC and/or the liquid or other fluid F.

In the embodiment of FIG. 10, the sheets 421 and 431 of the honeycomb array IH are of solar energy-transmitting plastic 421, as is the honeycomb section 425 secured between the sheets 421 and 431. The honeycomb array HTH has a honeycomb construction substantially the same as that of FIG. 9, and functions in substantially the same manner. In this embodiment, it will be seen that the solar energy rays pass through the light-transmitting sheets 421, 431, as well as the walls of the honeycomb 425, the rays being bent and also partially reflected in the course of this transmission therethrough, although the path of transmission therethrough is generally indicated by straight lines for simplicity of illustration in the schematic illustration of FIG. 10.

Figure 5:
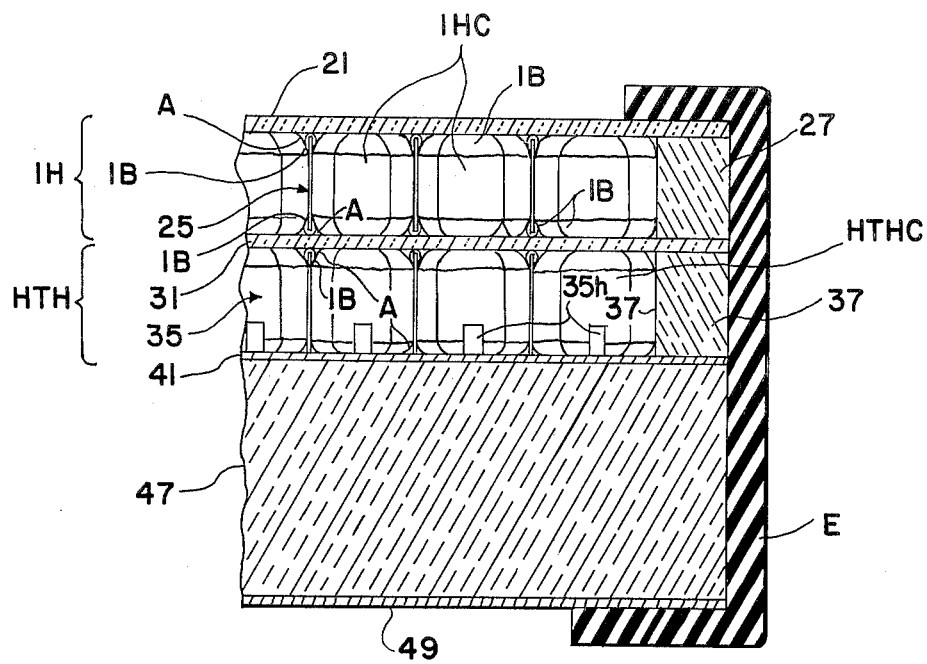
FIG. 5 is a fragmentary section view of a solar panel assembly generally similar to that of FIG. 1 viewing the assembly along a section extending across a portion of the width of the panel assembly at one edge zone.
Figure 7:
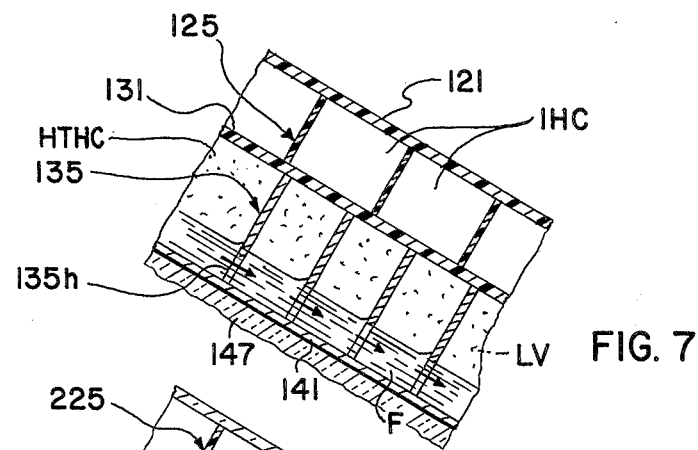

Referring again to the construction of FIGS. 5 and 6, it will be noted that in these two embodiments the honeycomb 25 is secured to the oppositely interfacing sheets 21, 31, through the medium of an insulating spacer bead IB arrangement and method of assembly. Likewise, the lower honeycomb 35 of the array HTH has its upper edge secured to the sheet 31 in this same fashion. This arrangement and method is employed to reduce conduction through the array IH from sheet 31 through honeycomb 25 to the sheet 21, and also to reduce conduction from the honeycomb 35 to the mid plate or sheet 31, particularly when a honeycomb array or arrays 25 and/or 35, is formed of relatively highly conductive material such as metal, including aluminum, or other desired structural material. This arrangement and method of construction is effected by coating an insulating bead IB onto and along the respective cell edges of the honeycomb 25 and/or 35, as the case may be, and permitting such bead to set. Suitable bead-forming material may take the form of adhesive such as thermo-setting or other curable resins such as epoxy cement. The desired bead formation may be enhanced by surface application, as by a roller, or by edge immersion, and subsequent curing with the beaded edge extending in a preferably generally downward direction. The insulating thickness or length of the bead at the edge of the respective honeycomb 25, 35, may be increased by repeated application of a suitable insulating material thereto, such as additional layers of cement or other adhesive or other insulating material, thereby forming multiple layers, with subsequent buildup of bead size. The beaded honeycomb 25, and/or 35, may then be secured in place to the respective sheet or sheets 21, 31, by further application of a suitable adhesive layer A to the beaded edges of the respective honeycomb, and thereupon holding the sheet and the beaded edge IB in contact until the adhesive A is set. It will thus be seen that the honeycomb core 25 and/or the honeycomb core 35 of the respective arrays IH and HTH may be thus suitably secured to the respective sheets 21, 31 with an insulating gap formed between the edges of the respective honeycomb section having the insulating bead IB thereon, and it will be appreciated that this arrangement and method of construction will be particularly useful in the instance of utilization of highly conductive material for the honeycomb arrays 25 and/or 35. The conduction between the honeycomb array 35 and the bottom wall 41 is, of course, desirably maximized, and to this end, the honeycomb 35 may be suitably secured to the bottom wall 41 as through the medium of a simple application of adhesive A thereto as shown in FIG. 6. While various other Figures do not illustrate the specific bonding construction between the various honeycomb and sheet members, it will be appreciated that either a simple adhesive connection, or a suitably secured beaded construction or other applicable interface joint may be affected for a given embodiment, dependent upon the materials involved and the desired maximizing and minimizing of the various trade-off considerations involved in the utilization of such materials and construction.

Several forms of arrangements for the holes 35h are illustrated in the embodiments of FIGS. 11–15 and FIGS. 11a–15a respectively. The embodiment of FIGS. 11 and 11a illustrates the utilization of round holes in the mid sections of the honeycomb 435, and such may be utilized for various fluids F, including the passage of liquid or gas therethrough.

In FIGS. 12 and 12a, holes 535h1 and 535h2 are employed, the holes 535h1 corresponding to the holes of the embodiment of FIG. 1, while the holes 535h2 are similar to those of FIG. 11. This will enable more full flow through the cells, and may be particularly useful with gas heat transfer fluid F, although liquids may also be utilized therein as the fluid F.

In the embodiment of FIGS. 13 and 13a, the holes are slots 635hcut in the bottom and top edges of the forward and rearward walls of the honeycomb 635, and this embodiment is particularly useful in the employment of a gas for the fluid F.

In the embodiment of FIGS. 14 and 14aa plurality of slots 735hare cut in the front and rear walls of the cells HTHC of the honeycomb 735, and serve to increase the flow, as well as the area of contact of the flow of fluid F along the surface of the bottom sheet or panel 741.

In the embodiment of FIGS. 15 and 15a, the holes 835h1 and 835h2 are a combination of the holes of FIGS. 11 and 14, and similarly serve to increase the flow and area of conductive heat transfer contact of fluid, as well as the zone over which the fluid is flowed with minimum impedance through the cells of honeycomb 835.

Referring again to the arrangement of FIG. 16, this arrangement illustrates the application of the invention in the heating of a building B. Any one of the structural solar panel assemblies 11 of the various previously illustrated and described embodiments thereof may be utilized as the individual panels 11 in which the multiple banks of panels which are supported as by a structural support frame S, at a suitable angle with respect to the anticipated angle of contact with the sun's rays SR. A suitably inclined reflector R may be and is preferably employed, particularly when it is desirable to utilize the arrangement both in periods when the sun travels relatively high overhead as well as at low angles, and when it is desirable to utilize the arrangement for air conditioning, as by absorptive cycle utilization of the collected heat from the structural solar panel assemblies 11. The arrangement of the solar panels 11, with or without the inclined reflectors R, may be suitably employed as the roofing of a building, or such may be suitably set upon the roof of a building.

In FIG. 16, the fluid F is stored in a large insulated storage tank or reservior ST from which it may be pumped by a pump 75 and selectively controllable throttle valve 79 to a header tank 51c, from which it passes through conduits 51band 51ato the respective inlet conduits 51 for the structural solar assemblies 11. After passage through the respective panels 11, the thus heated fluid F is returned through conduits 61a, 61b, 61rto the suitably insulated storage tank ST, and-/or such may be directly pumped through the medium of a pump 73, to suitable radiating or other heaters, as for instance space radiators, H suitably disposed in the room or rooms of the building B to be heated. From the heaters H, the fluid is returned to the bottom of the storage tank ST, for remixing with the fluid F therein, and subsequent reheating by passage through the line F51F to the respective solar panel assemblies 11 as previously noted. A valve 71 may be employed to enable shutoff or circulated flow of the fluid F to the heaters H, as necessary or desired. A throttle valve 79 is employed to control the flow of fluid F to the header 51cand header conduits 51a. A relief valve 77 may be arranged in paralled with the pump 75 for prevention of excess fluid pressure buildup on the outlet side of the pump 75. It will thus be seen that the fluid F may be diverted directly to the heaters H upon return from the solar panel assemblies 11 or may be flowed to the tank ST, as desired, through utilization of the valve 71 and pump 73. An overflow return line may be employed in the header 75 to enable excess fluid to return through the line 614 to the ST in the event of an undesirable excess fluid level buildup in the header tank 51c.

FIGS. 17 and 18 schematically illustrate two buildings B1 and B2 in which the structural solar panel assemblies 11 form respectively side walls and roof or a roof add on for the building B1 (FIG. 17), and where such panels form the roof of a building B2 (FIG. 18). The fluid distribution lines and components for the respective buildings are not illustrated other than to illustrate the general inlet and outlet manifold supply and exit lines 951f, 961r(FIG. 17) and 1051f, 1061r(FIG. 18), and header tanks 1051c(FIG. 18) for the respective buildings B1 and B2. It will be appreciated that suitable pumping, valving, and other necessary or desired fluid distribution arrangements may be utilized, for effecting internal heating heat of the buildings, such as the general fluid distribution arrangement as shown in the generalized arrangement as described in FIG. 16. Likewise, an absorptive air conditioning system may be utilized if desired, in which the solar heated fluid F is applied in a conventional or other desired absorptive cooling cycle arrangement (not shown) to enable cooling of the respective building or other enclosure. The relative and absolute sizing of the respective fluid flow lines in the arrangements of FIGS. 16, 17 and 18 may be effected according to standard engineering principles so as to allow for substantially equalized flow at the various inlets and outlets 51, 61, for the respective structural solar panel assemblies 11.

While the invention has been illustrated and described with respect to several physical embodiments and modes of operation, it will be appreciated that various modifications and improvements may be made without departing from the scope and spirit of the invention. Accordingly, the invention is not to be limited by the particular illustrative embodiments and modes of practice, but only by the scope of the appended claims.

I claim:

1. A solar energy collection and transfer arrangement, comprising,
   a honeycomb panel sandwich assembly including a light-transmitting multicelled honeycomb insulation layer having light-transmitting top and bottom sheets with a light-transmitting honeycomb celled core extending in facial interconnection therebetween and a lateral fluid flow heat transfer multicelled honeycomb layer connecting with and extending laterally beneath said insulation layer,
   and a plurality of lateral fluid passageways formed in the cell walls of said heat transfer multicelled honeycomb layer for guiding and passing heat transfer fluid beneath the bottom sheet of said insulation layer to absorb solar energy transferred thereto through said light-transmitting insulation layer.

2. A solar energy collection and transfer arrangement according to claim 1, and an insulation layer extending beneath said heat transfer layer.

3. A solar energy collection and transfer arrangement according to claim 2, said insulation layer comprising a layer of expanded foamed plastic.

4. A solar energy collection and transfer arrangement according to claim 1,
said heat transfer honeycomb layer having a plurality of discrete walled cells having lateral openings therein forming said lateral fluid passageways.

5. A solar energy transfer arrangement according to claim 4,
the lateral walls and bottom wall of said walled cells of said heat transfer honeycomb layer being dark colored and heat absorptive.

6. A solar energy transfer arrangement according to claim 5,
said dark lateral walls of said walled cells being opaque and having a dull surface for maximizing heat absorptive.

7. A solar energy transfer arrangement according to claim 4,
said fluid flow openings being formed in the lateral walls of said cells of said heat transfer honeycomb layer and connecting adjacent ones of said honeycomb cells in lateral fluid passing relation.

8. A solar energy transfer arrangement according to claim 7,
said lateral walls of said honeycomb cells being heat absorptive and dark colored with a dull matte surface.

9. A solar energy transfer arrangement according to claim 8,
said lateral walls of said honeycomb cells being opaque.

10. A solar energy transfer arrangement according to claim 7,
said honeycomb cells being generally hexagonal in shape and formed of laterally expanded laterally multilayered walls interconnected at staggered zones between succeeding lateral wall layers.

11. A solar energy transfer arrangement according to claim 7,
said honeycomb cells being formed of angularly intersecting walls.

12. A solar energy transfer arrangement according to claim 1,
the honeycomb cells of said light-transmitting insulation layer and the cells of said heat transfer layer being in non-alignment with one another.

13. A solar energy transfer arrangement according to claim 7,
the honeycomb cells of said light-transmitting insulation layer and the cells of said heat transfer layer being in general alignment with one another.

14. A solar energy transfer arrangement according to claim 7,
the cells in said insulation layer being different in size from the fluid flow connected cells of said fluid flow heat transfer layer.

15. A solar energy transfer arrangement according to claim 14,
the cells in said insulation layer having a greater depth/width ratio than the fluid-flow-connected cells of said lateral fluid flow heat transfer layer.

16. A solar energy transfer arrangement according to claim 14,
the cells in said insulation layer having a lesser depth/width ratio than the fluid-flow-connected cells of said lateral fluid flow heat transfer layer.

17. A solar energy transfer arrangement according to claim 7,
the cells in said insulation layer having a depth/width ratio greater than 1.

18. A solar energy transfer arrangement according to claim 17,
the walls of said cells in said insulation layer being light transmitting therethrough.

19. A solar energy transfer arrangement according to claim 17,
said ratio being greater than 2.

20. A solar energy transfer arrangement according to claim 19,
the walls of said cells in said insulation layer being light transmitting therethrough.

21. A solar energy transfer arrangement according to claim 7,
the cells in said insulation layer having a depth/width ratio lesser than 1.

22. A solar energy transfer arrangement according to claim 7,
the cells in said fluid flow heat transfer layer having a depth/width ratio greater than 1.

23. A solar energy transfer arrangement according to claim 22,
the lateral and bottom walls of said heat transfer layer cells being opaque and dark.

24. A solar energy transfer arrangement according to claim 7,
the cells in said fluid flow heat transfer layer having a depth/width ratio lesser than 1

25. A solar energy transfer arrangement according to claim 24,
the lateral and bottom walls of said heat transfer layer calls being opaque and dark.

26. A solar energy transfer arrangement according to claim 1,
said light-transmitting top and bottom sheets being substantially transparent to solar light.

27. A solar energy transfer arrangement according to claim 26,
at least one of said light-transmitting top and bottom sheets having a relatively low transmittance for black body radiation wave-lengths.

28. A solar energy transfer arrangement according to claim 27,
said low transmittance sheet being at least said bottom sheet of said insulation layer.

29. A solar energy transfer arrangement according to claim 26,
at least one of said light-transmittance top and bottom sheets being glass.

30. A solar energy transfer arrangement according to claim 29,
both of said top and bottom sheets of said insulation layer being glass.

31. A solar energy transfer arrangement according to claim 26,
at least one of said light-transmittance top and bottom sheets being plastic.

32. A solar energy transfer arrangement according to claim 29,
both of said top and bottom sheets of said insulation layer being plastic.

33. A solar energy transfer arrangement according to claim 7,
said heat transfer honeycomb layer having an opaque dark dull upper-surfaced bottom sheet.

34. A solar energy transfer arrangement according to claim 7,
the lateral walls of saidcells of said insulation layer being smooth and highly reflective to incident light.

35. A solar energy transfer arrangement according to claim 34,
the walls of said cells of said insulation layer being of solar light-transmitting material.

36. A solar energy transfer arrangement according to claim 7,
the walls of sid cells of at least one of said layers being formed of pressed fiber sheet material.

37. A solar energy transfer arrangement according to claim 36,
said pressed fiber sheet material being paper.

38. A solar energy transfer arrangement according to claim 36,
the cells walls of said heat transfer layer being formed of pressed fiber sheet material covered with fluid-absorptive resistant material for fluid absorptive resistance during flow of fluid through he cells of said heat transfer layer.

39. A solar transfer arrangement according to claim 36,
the cell walls of said insulation layer being formed of pressed fiber sheet material and having an incident light-reflective surface covering for increase of incident light reflectively.

40. A solar energy transfer arrangement according to claim 7,
the walls of said cells of said fluid flow heat transfer layer being formed of material of good heat conductivity.

41. A solar energy transer arrangement according to claim 40, 'said good conductivity material being metal.

42. A solar energy transfer arrangement according to claim 40,
said bottom sheet of said heat transfer layer being formed of material of good heat conductively.

43. A solar energy arrangement according to claim 42,
said bottom sheet and said cell walls of said fluid flow heat transfer layer being formed of metal.

44. A solar energy transfer arrangement according to claim 7,
the lateral walls forming the cells of said insulation layer being secured between and in insulated spaced relation between said top and bottom sheets of said insulation layer.

45. A solar energy transfer arrangement according to claim 44,
the lateral walls of the cells of said fluid flow heat transfer layer being secured to and in insulated spaced relation from said bottom light-transmitting sheet of said insulation layer.

46. A solar energy transfer arrangement according to claim 45,
said secured insulated spaced relation of said cells and sheets being formed by a heat-insulating bead disposed on the edges of said cell walls, which bead is in turn secured to the respective said sheet.

47. A solar energy transfer arrangement according to claim 44,
said secured insulated spaced relation of said cells and sheets being formed by a heat-insulating bead disposed on the edges of said cell walls, which bead is in turn secured to the respective said sheet.

48. A solar energy transfer arrangement according to claim 1,
the lateral walls forming the cells of said insulation layer being secured in insulated spaced relation between said top and bottom sheets of said insulation layer.

49. A solar energy transfer arrangement according to claim 48,
said secured insulated spaced relation of said cells and sheets being formed by a heat-insulating cured adhesive bead disposed on the edges of said cell walls, which bead is in turn secured to the respective said sheet by a further adhesive.

50. A solar energy transfer arrangement according to claim 1,
said multicelled honeycomb insulation layer being under a vacuum.

51. A solar energy transfer arrangement according to claim 1,
and fluid flow means for passing a heat transfer fluid through said lateral fluid passageways formed in said cell walls of said heat transfer multicelled honeycomb layer.

52. A solar energy transfer arrangement according to claim 51,
said fluid flow means comprising a fluid pump and conduit means connecting between said pump and said heat transfer multicelled honeycomb layer.

53. A solar energy transfer arrangement according to claim 52,
further comprising heat radiation means in fluid connection with said conduit means and spaced from said honeycomb panel sandwich assembly.

54. A solar energy transfer arrangement according to claim 53,
said heat radiation means comprising a building radiator for heating of a building.

55. A solar energy transfer arrangement according to claim 52,
said heat radiation means comprising a portion of an evaporative cooling unit for a building 56. A solar energy transfer arrangement according to claim 52,
said honeycomb panel sandwich assembly being a building roof panel.

57. A solar energy transfer arrangement according to claim 52,
said honeycomb panel sandwich assembly being a building side wall panel.

58. A solar energy transfer arrangement according to claim 52,
and a plurality of said honeycomb panel sandwich assemblies forming a building roof,
said fluid flow means connecting in fluid flow relation with said plurality of honeycomb panel sandwich assemblies.

59. A solar energy transfer arrangement according to claim 52,
and a plurality of said honeycomb panel sandwich assemblies forming a building side wall, said fluid flow means connecting in fluid flow relation with said plurality of honeycomb panel sandwich assemblies.

60. A solar energy transfer arrangement according to claim 52,
and a plurality of said honeycomb panel sandwich assemblies forming a building roof and side wall,
said fluid flow means connecting in fluid flow relation with said plurality of honeycomb panel sandwich assemblies.

61. A solar energy transfer arrangement according to claim 52,
and an insulated heat storage tank in fluid flow connection with said fluid flow means.

62. The method of collection and transfer of solar energy to a heat conductive fluid, comprising
passing solar light rays through a first light transmitting insulating multicelled honeycomb sandwich array of multiple discrete insulating cells and into contact with a second solar energy absorbing multicelled honeycomb sandwich array,
and passing a heat transfer fluid laterally through the cells of said second solar energy absorbing honeycomb array and to a heat transfer zone external of said arrays for further heat transfer of energy absorbed by said fluid during passage through said cells of said solar energy absorbing honeycomb array.

63. The method according to claim 62, including passing said solar light rays through said first honeycomb array while the cells of said first honeycomb array are under a vacuum.

64. The method according to claim 62, including passing said solar light rays through solar light transmitting sheets of said insulating honeycommb array, at least one of said sheets being substantially opaque to transmittance of black body radiation.

65. The method according to claim 62, including passing said solar light rays through light transmitting first and second upper and lower spaced bounding sheets of said first light transmitting insulating honeycomb sandwich array, said sheets being substantially opaque to transmittance of black body re-radiation frequencies therethrough from said second solar energy absorbing honeycomb array.

66. The method according to claim 62, including passing of said solar light rays into energy absorbing contact with a dark walled energy absorbing zone of said second solar energy absorbing honeycomb sandwich array.

67. The method according to claim 66, and passing said heat transfer fluid in heat transfer contact with said dark walled energy absorbing zone.

68. The method according to claim 66, and passing said heat transfer fluid as a liquid in contact with said dark walled energy absorbing zone.

69. The method according to claim 66, including reflecting incident said solar light off the surfaces of the wall forming said cells of said first light transmitting insulating multicelled honeycomb sandwich array and passing the reflected said light rays into contact with a dark walled energy absorbing zone of said second solar energy absorbing honeycomb sandwich array.

70. The method according to claim 66, and reflecting and resisting passage of black body radiation from said dark walled black body radiation from said dark walled energy absorbing zone of said second solar energy absorbing honeycomb sandwich array, out into and through said first solar light transmitting honeycomb sandwich array.

71. The method according to claim 66, and extracting solar accumulated heat from said fluid at said further heat transfer zone external of and spaced from said arrays.

72. The method according to claim 71, and heating a portion of a building with said extracted solar accumulated heat.

73. The method according to claim 71, and effecting absorption cycle cooling by said extracted solar accumulated heat to enable cooling of a portion of a building.

74. The method according to claim 62, including passing of said solar light rays into energy absorbing contact with dark walled energy absorbing side and bottom cell walls of said solar energy absorbing honeycomb sandwich array.

75. The method according to claim 74, and passing said heat transfer fluid as a liquid along the bottom wall of said second energy absorbing multicelled honeycomb sandwich array.

76. The method according to claim 74, and passing said heat transfer fluid as a plurality of liquid streams along the bottom wall of said second energy absorbing multicelled honeycomb array.

77. The method according to claim 62, and passing said heat transfer fluid as a plurality of liquid streams along the bottom wall of said second energy absorbing multicelled honeycomb sandwich array.

78. The method according to claim 66, including passing said solar light rays through the side walls forming the cells of said first light transmitting insulating multicelled honeycomb sandwich array.

79. A solar energy collectiion and transfer arrangement, comprising
a honeycomb panel sandwich assembly including a light-transmitting insulation layer having light-transmitting top and bottom sheets and a lateral fluid flow heat transfer multicelled honeycomb layer extending laterally beneath said insulation layer,
and lateral fluid passageways formed in the cell lateral walls of said heat transfer multicelled honeycomb layer for guiding and passing heat transfer fluid beneath the bottom sheet of said insulation layer to absorb solar energy transferred thereto through said light-transmitting insulation layer.

80. A solar energy collection and transfer arrangement according to claim 79,
and an insulation layer extending beneath said heat transfer layer.

81. A solar energy collection and transfer arrangement according to claim 80,
said insulation layer comprising a layer of expanded foamed plastic.

82. A solar energy collection and transfer arrangement according to claim 79,
said heat transfer honeycomb layer having a plurality of discrete walled cells having lateral openings therein forming said lateral fluid passageways and connecting adjacent ones of said honeycomb cells in lateral fluid passing relation.

83. A solar energy collection and transfer arrangement according to claim 82,
the lateral walls and bottom wall of said walled cells of said heat transfer honeycomb layer being dark colored and heat absorptive.

84. A solar energy collection and transfer arrangement according to claim 83,
said dark lateral walls of said walled cells eing opaque and having a dull surface for maximizing heat absorption.

85. A solar energy collection and transfer arrangement according to claim 84,
the walls of said cells of said heat transfer honeycomb layers being formed of pressed fiber sheet material.

86. A solar energy collection and transfer arrangement according to claim 85,
said pressed fiber sheet material being paper.

87. A solar energy collection and transfer arrangement according to claim 85,
the cell walls of said heat transfer layer being formed of pressed fiber sheet material covered with fluid-absorption-resistant material for fluid absorption resistance during flow of fluid through the cells of said heat transfer layer.

88. A solar energy collection and transfer arrangement according to claim 79,
said lateral walls of said honeycomb cells being heat absorptive and dark colored with a dull matte surface.

89. A solar energy collection and transfer arrangement according to claim 88,
said lateral walls of said honeycomb cells being opaque.

90. A solar energy collection and transfer arrangement according to claim 79,
said honeycomb cells being generally hexagonal in shape and formed of laterally expanded laterally multilayered walls interconnected at staggered zones between succeeding lateral wall layers.

91. A solar energy collection and transfer arrangement according to claim 79,
said honeycomb cells being formed an angularly intersecting walls.

92. A solar energy collection and transfer arrangement according to claim 79,
the honeycomb cells in said fluid flow heat transfer multicelled honeycomb layer having a depth/width ratio greater than 1.

93. A solar energy collection and transfer arrangement according to claim 92,
the lateral and bottom walls of said heat transfer multicelled honeycomb layer cells being opaque and dark.

94. A solar energy collection and transfer arrangement according to claim 79,
the honeycomb cells in said fluid flow heat transfer multicelled honeycomb layer having a depth/width ratio lesser than 1.

95. A solar energy collection and transfer arrangement according to claim 94,
the lateral and bottom walls of said heat transfer layer cells being opaque and dark.

96. A solar energy collection and transfer arrangement according to claim 79,
said light-transmitting top and bottom sheets being substantially transparent to solar light.

97. A solar energy collection and transfer arrangement according to claim 96,
at least one of said light-transmitting top and bottom sheets having a relatively low transmittance for black body radiation wave-lengths.

98. A solar energy collection and transfer arrangement according to claim 97,
said low transmittance sheet being at least said bottom sheet of said insulation layer.

99. A solar energy collection and transfer arrangement according to claim 96,
at least one of said light-transmitting top and bottom sheets being plastic.

100. A solar energy collection and transfer arrangement according to claim 99,
both of said top and bottom sheets of said insulation layer being plastic.

101. A solar energy collection and transfer arrangement according to claim 96,
at least one of said light-transmitting top and bottom sheets being glass.

102. A solar energy collection and transfer arrangement according to claim 101,
both of said top and bottom sheets of said insulation layer being glass.

103. A solar energy collection and transfer arrangement according to claim 79,
said heat transfer honeycomb layer having an opaque dark dull upper-surfaced bottom sheet.

104. A solar energy collection and transfer arrangement according to claim 79,
the lateral walls of said cells of said insulation layer being smooth and highly reflective in incident light.

105. A solar energy collection and transfer arrangement according to claim 104,
the walls of said cells of said insulation layer of solar light-transmitting material.

106. A solar energy collection and transfer arrangement according to claim 79,
the walls of said cells of said fluid flow heat transfer honeycomb layer being formed of material of good heat conductivity.

107. A solar energy collection and transfer arrangement according to claim 106,
said good conductivity material being metal.

108. A solar energy collection and transfer arrangement according to claim 106,
said bottom sheet of said heat transfer honeycomb layer being formed of material of good heat conductivity.

109. A solar energy collection and transfer arrangement according to claim 108,
said bottom sheet and said cell walls of said fluid flow heat transfer layer being formed of metal.

110. A solar energy collection and transfer arrangement according to claim 79,
the lateral walls of the cells of said fluid flow heat transfer layer being secured to and in insulated space relation from a bottom light-transmitting sheet between said insulation layer and said heat transfer honeycomb layer.

111. A solar energy collection and transfer arrangement according to claim 79,
said fluid passageways being formed at the lower extent of said cell lateral walls.

112. A solar energy collection and transfer arrangement according to claim 79, said fluid passageways being formed at the upper extent of said cell lateral walls.

113. A solar energy collection and transfer arrangement according to claim 79,
including plural said passageways in individual said lateral walls.

114. A solar energy collection and transfer arrangement according to claim 79,
said plural said passageways in an individual said lateral wall being laterally side by side at the lower extent of the respective said wall.

115. A solar energy collection and transfer arrangement according to claim 79,
said insulation layer being under a vacuum.

116. A solar energy collection and transfer arrangement according to claim 79,
and fluid flow means for passing a heat transfer fluid through said lateral fluid passageways formed in said cell walls of said heat transfer multicelled honeycomb layer.

117. A solar energy collection and transfer arrangement according to claim 116,
said fluid flow means comprising a fluid pump and conduit means connecting between said pump and said heat transfer multicelled honeycomb layer.

118. A solar energy collection and transfer arrangement according to claim 117,
further comprising heat radiation means in fluid connection with said conduit means and spaced from said honeycomb panel sandwich assembly.

119. A solar energy collection and transfer arrangement according to claim 118,
said heat radiation means comprising a building radiator for heating of a building.

120. A solar energy collection and transfer arrangement according to claim 117,
said heat radiation means comprising a portion of an evaporative cooling unit for a building.

121. A solar energy collection and transfer arrangement according to claim 117,
said honeycomb panel sandwich assembly being a building roof panel.

122. A solar energy collection and transfer arrangement according to claim 117,
said honeycomb panel sandwich assembly being a building side wall panel.

123. A solar energy collection and transfer arrangement according to claim 117,
and a plurality of said honeycomb panel sandwich assemblies forming a building roof,
said fluid flow means connecting in fluid flow relation with said plurality of honeycomb panel sandwich assemblies.

124. A solar energy collection and transfer arrangement according to claim 117,
and a plurality of said honeycomb panel sandwich assemblies forming a building side wall,
said fluid flow means connecting in fluid flow relation with said plurality of honeycomb panel sandwich assemblies.

125. A solar energy collection and transfer arrangement according to claim 117,
and a plurality of said honeycomb panel sandwich assemblies forming a building roof and side wall,
said fluid flow means connecting in flow relation with said plurality of honeycomb panel sandwich assemblies.

126. A solar energy collection and transfer arrangement according to claim 117,
and an insulated heat storage tank in fluid flow connection with said fluid flow means.

127. The method of collection and transfer of solar energy to a heat conductive fluid, comprising
passing solar light rays through a light-transmitting insulating layer and into contact with a solar energy-absorbing and heat transfer multicelled honeycomb sandwich array,
and passing a heat transfer fluid laterally through the cells of said solar energy-absorbing and transfer honeycomb array and to a heat transfer zone external of said arrays for further heat transfer of energy absorbed by said fluid during passage through said cells of said solar energy-absorbing honeycomb array.

128. The method according to claim 127,
passing said solar light rays through a honeycomb array formed in said insulating layer, intermediate to passage to said solar energy-absorbing and heat transfer multicelled honeycomb sandwich array.

129. The method according to claim 127, including passing said solar light rays through said insulating layer while the cells of said insulating are under a vacuum.

130. The method according to claim 127, including passing said solar light rays through solar light-transmitting sheets of said insulating layer, at least one of said sheets being substantially opaque to transmittance of black body radiation.

131. The method according to claim 128, including passing said solar light rays through light-transmitting first and second upper and lower spaced bounding sheets of said first light-transmitting insulating layer, said sheets being substantially opaque to transmittance of black body re-radiation frequencies therethrough from said second solar energy-absorbing honeycomb array.

132. The method according to claim 127, including passing of said solar light rays into energy-absorbing contact with a dark-walled energy-absorbing zone of said solar energy-absorbing and heat transfer honeycomb sandwich array.

133. The method according to claim 132,
and passing said heat transfer fluid in heat transfer contact with said dark-walled energy-absorbing zone.

134. The method according to claim 132,
and passing said heat transfer fluid as a liquid in contact with said dark-walled energy-absorbing zone.

135. The method according to claim 127,
includig passing of said solar light rays into energy-absorbing contact with dark-walled energy-absorbing side and bottom cell walls of said solar energy-absorbing and heat transfer multicelled honeycomb sandwich array.

136. The method according to claim 135,
and passing said heat transfer fluid as a liquid along the bottom wall of said solar energy-absorbing and heat transfer multicelled honeycomb sandwich array.

137. The method according to claim 135,
and passing said heat transfer fluid as a plurality of liquid streams along the bottom wall of said solar energy-absorbing and heat transfer multicelled honeycomb sandwich array.

138. The method according to claim 127,
and passing said heat transfer fluid as a plurality of liquid streams along the bottom wall of said solar energy-absorbing and heat transfer multicelled honeycomb sandwich array.

139. The method according to claim 127,
and extracting solar accumulated heat from said fluid at said further heat transfer zone external of and spaced from said insulating layer and heat transfer honeycomb sandwich array.

140. The method according to claim 139,
and effecting absorption cycle cooling by said extracted solar accumulated heat to enable cooling of a quantity of environmental air.

141. The method according to claim 139,
and effecting heating of quantity of air or liquid with heat extracted from said fluid at said further heat transfer zone.

* * * * *

UNITED STATES PATENT AND TRADEMARK OFFICE
CERTIFICATE OF CORRECTION

PATENT NO. : 4,018,211

DATED : April 19, 1977

INVENTOR(S) : Irwin R. Barr

It is certified that error appears in the above-identified patent and that said Letters Patent are hereby corrected as shown below:

Column 1, Line 18, change "unigue" to ---unique---

Column 3, Line 26, change "or" to ---of---

Column 6, Line 22, change "honeycombs" to ---honeycomb---

Column 8, Line 67, change "affected" to ---effected---

Column 9, Line 19, between "635h" and "cut" leave space

Column 9, Line 23, between "14a" and "a" leave space

Column 9, Line 24, between "735h" and "are" leave space

Column 9, Line 60, between "51b" and "and" leave space

Column 9, Line 60 between "51a" and "to" leave space

Column 9, Line 64, between "61r" and "to" leave space

Column 10, Line 9, between "51c" and "and" leave space

Column 10, Line 10 change "paralled" to ---parallel---

Column 10, Line 18, after "the" (second occurrence) insert ---tank---

Column 11, Line 25, change "absorptive" to ---absorption---

Column 11, Line 53, change dependency to "claim 1" to ---claim 7---

Column 12, Line 39, after "1" insert ---.---

Column 12, Line 43, change "calls" to ---cells---

Column 12, Line 59, change "light-transmittance" to ---light-transmitting---

Column 12, Line 67, change "light-transmittance" to ---light-transmitting---

Column 13, Line 11, between "said" and "cells" leave space

Column 13, Line 19, change "sid" to ---said---

Column 13, Line 28, change "absorptive" (both occurrences) to ---absorption---

UNITED STATES PATENT AND TRADEMARK OFFICE
CERTIFICATE OF CORRECTION

PATENT NO. : 4,018,211
DATED : April 19, 1977
INVENTOR(S) : Irwin R. Barr

It is certified that error appears in the above-identified patent and that said Letters Patent are hereby corrected as shown below:

Column 13, Line 29, change "he" to ---the---
Column 13, Line 31, after "solar" insert ---energy---
Column 13, Line 42, change "transer" to ---transfer---
Column 13, Line 48, change "conductively" to ---conductivity---
Column 13, Line 49, after "energy" insert ---transfer---
Column 15, Line 35, change "honeycommb" to ---honeycomb---
Column 16, Line 30, after "honeycomb" insert ---sandwich---
Column 16, Line 42, change "collectiion" to ---collection---
Column 17, Line 10, change "eing" to ---being---
Column 18, Line 33, change "in" to ---to---
Column 18, Line 36, after "layer" insert ---being---
Column 18, Line 60, change "space" to ---spaced---
Column 19, Line 66, after "in" insert ---fluid---
Column 20, Line 54, change "includig" to ---including---

Signed and Sealed this

Twelfth Day of May 1981

[SEAL]

Attest:

RENE D. TEGTMEYER

Attesting Officer

Acting Commissioner of Patents and Trademark